United States Patent [19]

Izumi et al.

[11] Patent Number: 5,359,586
[45] Date of Patent: Oct. 25, 1994

[54] READ OUT APPARATUS FOR READING OUT INFORMATION FROM MAGNETO-OPTIC DISK

[75] Inventors: Haruhiko Izumi; Masaharu Moritsugu; Masakazu Taguchi, all of Kawasaki, Japan

[73] Assignee: Fujitsu Limited, Kawasaki, Japan

[21] Appl. No.: 115,325

[22] Filed: Sep. 2, 1993

[30] Foreign Application Priority Data

Sep. 24, 1992 [JP] Japan .................. 4-253385

[51] Int. Cl.⁵ .............................. G11B 7/00
[52] U.S. Cl. ............................ 369/59; 369/13; 369/110; 369/124
[58] Field of Search ............ 369/13, 48, 53–54, 369/59, 60, 110, 124; 360/114

[56] References Cited

U.S. PATENT DOCUMENTS

| | | | |
|---|---|---|---|
| 4,894,816 | 1/1990 | Sukeda et al. | 369/54 |
| 5,105,399 | 4/1992 | Shimonou | 360/114 |
| 5,233,589 | 8/1993 | Saito et al. | 369/124 X |
| 5,235,590 | 8/1993 | Taguchi et al. | 369/13 X |

FOREIGN PATENT DOCUMENTS 61-214278 9/1986 Japan .
63-53722 3/1988 Japan .

Primary Examiner—W. R. Young
Attorney, Agent, or Firm—Staas & Halsey

[57] ABSTRACT

An apparatus for reading out data recorded on a magneto-optic disk by detecting edges of magnetic domains formed such that the direction of magnetization thereof is opposite to the direction of the magnetization initially formed on the magneto-optic disk, the edges of the magnetic domains corresponding to "1"s of the recorded data. The data read out apparatus includes a read out signal generation portion for generating a read out signal by scanning the magnetic domains on the magneto-optic disk, a binarization portion for converting the read out signal into a binarized signal, and an edge detection portion for detecting from the binarized signal a front edge signal and a rear edge signal corresponding to the front edge and the rear edge of the magnetic domains, respectively. A front edge signal from a fixed delay device and a rear edge signal from a variable delay device are input to an OR circuit and an edge signal is output therefrom. A phase-locked loop circuit generates a clock signal synchronized with the edge signal and this clock signal is used in a data separator for separating the data from the edge signal output from the OR circuit.

7 Claims, 9 Drawing Sheets

FIG.IA
PRIOR ART
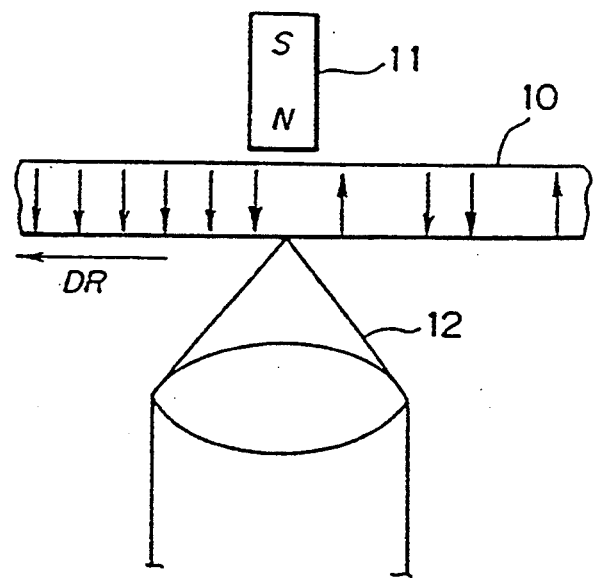
FIG.IB
PRIOR ART
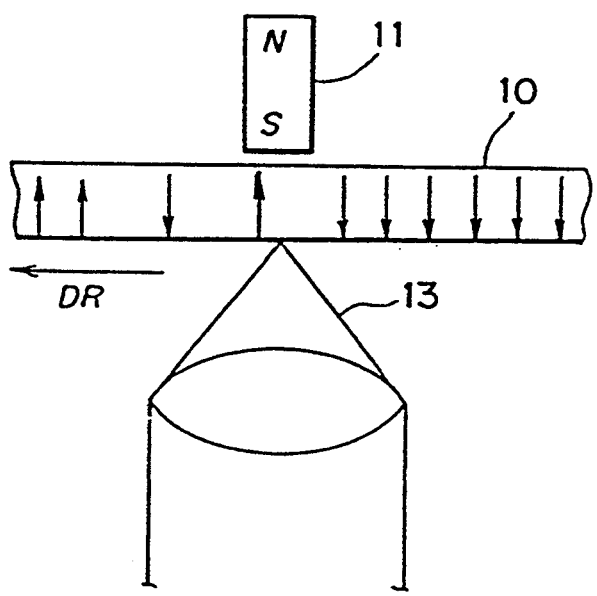

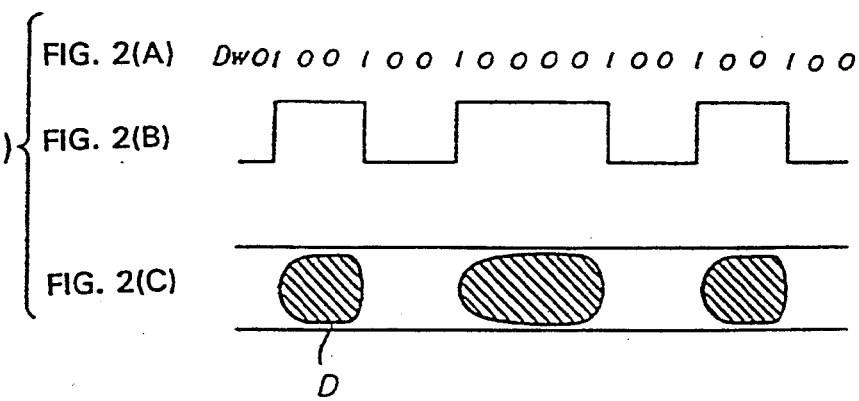
FIGS. 2(A)-(C) PRIOR ART
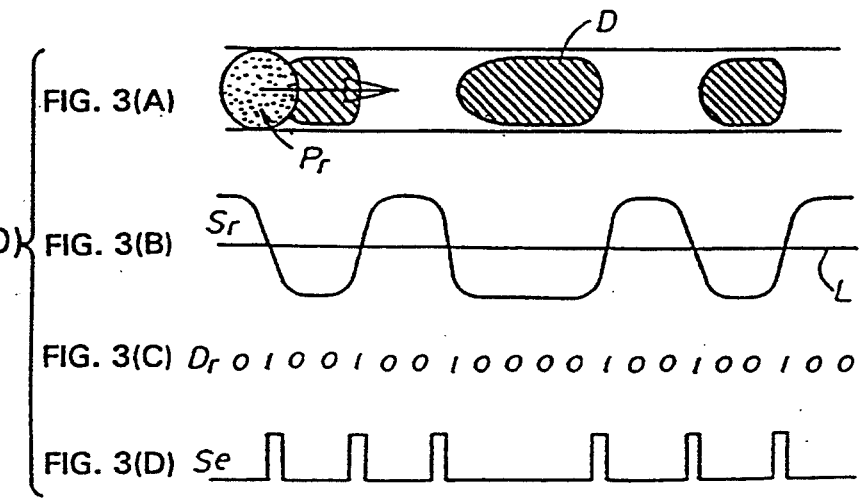
FIGS. 3(A)-(D) PRIOR ART

FIGS. 9(A)-(J)

READ OUT APPARATUS FOR READING OUT INFORMATION FROM MAGNETO-OPTIC DISK

BACKGROUND OF THE INVENTION

1. Field of the Invention

The present invention relates to a read out apparatus for reading out information from a magneto-optic disk.

2. Description of the Related Art

Magneto-optic disks are becoming popular because of the large memory capacity, high reliability, and the like. Hence, the magneto-optic disk is applicable to various fields including recording and read out of image information and recording coded data for use in computers.

A description will be given of the basic principle of recording and reading out information on and from a magneto-optic disk with reference to FIGS. 1A and 1B.

First, as shown in FIG. 1A, an external magnetic field of a magnet 11 is applied on a magneto-optic disk 10, and an erasing beam 12 is thrown on a part where information is to be rewritten. The part which is irradiated by the erasing beam 12 is heated, and the direction of magnetization at this part is arranged in one direction.

Then, as shown in FIG. 1B, the direction of the external magnetic field of the magnet 11 is reversed. A recording light beam 13 is thrown on the magneto-optic disk 10 in accordance with data Dw shown in FIG. 2(A) which is to be recorded as shown in FIG. 2(B). Hence, the magneto-optic disk 10 is selectively heated and magnetic domains D having opposite directions of magnetization to that of surrounding area are formed so that edge positions of the magnetic domains correspond to the data "1"s of the data Dw to be recorded as shown in FIG. 2(C). The magnetic domains D are formed on tracks or track turns of the magneto-optic disk 10.

There are two methods of forming the magnetic domains D. The mark position recording method forms the magnetic domains D in accordance with the data "1"s of the data Dw to be recorded. On the other hand, the mark edge recording method (or the mark length recording method) forms the magnetic domains D so that leading or trailing edges correspond to the data "1"s of the data Dw to be recorded. According to the mark position recording method, it is difficult to improve the recording density because the recorded data Dw is made to correspond as it is to the direction of the magnetization. However, the mark edge recording method is a compression technique which makes the data "1"s of the data Dw to be recorded correspond to the edges of the magnetic domains D, and it is possible to greatly improve the recording density.

FIGS. 2(A) through (C) respectively show the data Dw to be recorded, the light emitting pattern of the recording light beam 13, and the recorded magnetic domains D on the magneto-optic disk 10 for the case where the edge recording method is employed. Hence, the recording light beam 13 is turned ON and OFF as shown in FIG. 2(B) in accordance with the data "1"s of the data Dw to be recorded shown in FIG. 2(A), so that the edges of the magnetic domains D on the magneto-optic disk 10 correspond to the data "1"s of the data Dw to be recorded as shown in FIG. 2(C).

When reading out the recorded information from the magneto-optic disk 10, a read out light spot Pr scans the magnetic domains D as shown in FIG. 3(A). A read out signal Sr shown in FIG. 3(B) is obtained by the scan of the read out light spot Pr, and read out data Dr shown in FIG. 3(C) can be read out by detecting the edges of the read out signal waveform shown in FIG. 3(B).

Various systems have been proposed for reading out information from the magneto-optic disk, and examples of such systems are disclosed in Japanese Laid-open Patent Application Nos. 61-214278 and 63-53722.

FIG. 4 shows an example of a conventional read out system. The read out system shown in FIG. 4 includes a head 111, an amplifier 112, a signal processing circuit 113, a phase-locked loop (PLL) circuit 114, a data separator 115, and a decoding circuit 116, which are connected as shown. When the read out light spot Pr scans tracks of the magneto-optic disk 10, the read out signal Sr shown in FIG. 3(B) is output from the amplifier 112. The signal processing circuit 113 processes the read out signal Sr and outputs an edge signal Se shown in FIG. 3(D) which indicates the rising and falling edge positions of the read out signal Sr. A clock signal is formed in the PLL circuit 114 based on the edge signal Se, and the data separator 115 obtains the read out data Dr shown in FIG. 3(C) based on the clock signal and the edge signal Se. Since the read out data Dr takes the form of a run length limited code suited for the recording on the magneto-optic disk 10, the read out data Dr (code) is converted into a normal digital data in the decoding circuit 116.

Generally, the edge positions of the read out signal Sr are detected by the use of a threshold value L shown in FIG. 3(B). This threshold value L is a center value between maximum and minimum values of the read out signal Sr, and the intersections of the read out signal Sr and this threshold value L are detected as the edge positions of the magnetic domains D.

FIG. 5 shows a data format on the magneto-optic disk 10. In order to manage the recorded data, each track of the magneto-optic disk 10 is divided into ten-odd sectors. A sector mark Ms which indicates the start of the sector is recorded at the head of each sector, and an identification (ID) number Mi which specifies each sector is recorded after the sector mark Ms. The sector mark Ms and the ID number Mi are physically formed pits of λ/4 in depth, where λ denotes the wavelength. Variable frequency oscillator (VFO) pull-in domains are recorded in a VFO pull-in area Mv and phase adjusting domains are recorded in a synchronized byte (SB) area Ms, both by magnetic means, following the ID number Mi. Further, the data is recorded in a data area Md following the SB area Ms. The VFO pull-in domains are made up of magnetic domains which have a predetermined length and are arranged at predetermined intervals.

When the operator specifies the data which is to be read out at the time of the read out, the head 111 moves to the sector which contains the specified data. Then, after confirming that the ID number of this sector matches the ID number of the target sector which contains the specified data, the read out signal Sr shown in FIG. 3(B) is obtained by reading the row of the VFO pull-in domains recorded in the VFO pull-in area Mv, and the edge positions of each of the domains are detected from the edge signal Se shown in FIG. 3(D). As described above, the VFO pull-in domains are made up of magnetic domains which have a predetermined length and are arranged at predetermined intervals. Accordingly, by supplying to the PLL circuit 114 the edge signal Se which is obtained based on the read out signal Sr of the VFO pull-in domains, it is possible to adjust the frequency of the clock signal to a predetermined frequency prior to the data read out. In addition, it is also possible to adjust the phase of the frequency-adjusted clock signal using the domains of the SB area Ms.

However, according to the edge recording method, the edges of the magnetic domains correspond to the data "1"s of the data to be recorded. For this reason, unless the recording is made so that the length of the magnetic domains accurately matches a predetermined length, there is a problem in that the decoded read out data will not match the data to be recorded.

On the other hand, the magneto-optic disk is heated by a laser beam at the time of the recording. Hence, there is a problem in that the length of the magnetic domains becomes different at parts of the magneto-optic disk even if the recording is carried out at the same laser power, due to inconsistent heating conditions, a change in ambient temperature, non-uniform heat sensitivities at various parts of the magneto-optic disk, and the like. Furthermore, there is a problem in that the length of the magnetic domains becomes different among the individual magneto-optic disks due to non-uniform heat sensitivities among the magneto-optic disks and the like.

SUMMARY OF THE INVENTION

Accordingly, an object of the present invention is to provide a read out apparatus of data from a magneto-optic disk capable of accurate read out of recorded data even when the length of the magnetic domain formed on the magneto-optic disk is not accurately in agreement with a predetermined length by correcting the length of the domain readily and properly.

In accordance with an aspect of the present invention, there is provided an apparatus for reading out data recorded on a magneto-optic disk by detecting edges of magnetic domains formed such that the direction of magnetization thereof is opposite to the direction of the magnetization initially formed on the magneto-optic disk, the edges of the magnetic domains corresponding to "1"s of the recorded data, comprising: read out signal generation means for generating a read out signal by scanning the magnetic domains on the magneto-optic disk; binarization means connected with the read out signal generation means for converting the read out signal into a binarized signal; edge detection means connected with the binarization means for detecting from the binarized signal a front edge signal and a rear edge signal corresponding to the front edge and the rear edge of the magnetic domains, respectively; fixed delay means connected with the edge detection means for delaying either of the front edge signal and the rear edge signal; variable delay means connected with the edge detection means for delaying the other of the front edge signal and the rear edge signal; combiner means connected with the fixed delay means and the variable delay means for combining the output signal of the fixed delay means and the output signal of the variable delay means; integrator means connected with the variable delay means and the combiner means for integrating the output signal of the combiner means and outputting the integrated value to the variable delay means, the integrated value determining the delay amount of the variable delay means; an OR circuit connected with the fixed delay means and the variable delay means for outputting an edge signal; a phase-locked loop circuit connected with the OR circuit for generating a clock signal synchronized with the edge signal; and data separator means connected with the phase-locked loop circuit and the OR circuit for separating the data from the edge signal output from the OR circuit by the use of the clock signal output from the phase-locked loop circuit.

The integrator means includes an integrator circuit for integrating the combined signal and outputting the integrated value, convergence judgment means for judging whether or not the integrated value has converged to a specific value, and sample and hold means for sampling and holding the integrated value converged to the specific value.

According to the present invention, information recorded on a magneto-optic disk can be accurately read out not affected by changes in the ambient temperature, fluctuations among magneto-optic disks in their characteristics, tear drop shape of the magnetic domain, and the like, and without the need for using a large scaled circuit. Further, since the integrated value for determining the delay amount of the variable delay means is feedback controlled to become a specific value, recorded data on the magneto-optic disk can be read out accurately by having the magnetic domains recorded on the magneto-optic disk corrected even if their length is not in agreement with a predetermined length.

Preferably, the data read out apparatus further includes an offset voltage supply for generating and supplying an offset voltage to the variable delay means to thereby cause the variable delay means to generate a delay amount virtually equal to the delay amount of the fixed delay means and an adder for adding the offset voltage and the integrated value output from the sample and hold means.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1A is a diagram explanatory of a process to record information on a magneto-optic disk;

FIG. 1B is a diagram explanatory of a process to read out information recorded on a magneto-optic disk;

FIGS. 2(A)–(C) is a diagram explanatory of a process to record information;

FIGS. 3(A)–(D) is a diagram explanatory of a process to read out information;

DESCRIPTION OF THE PREFERRED EMBODIMENTS

Before describing an embodiment of the present invention, a system for achieving correction of the edge positions of magnetic domains substantially disclosed in a pending U.S. application Ser. No. 07/851,537, now U.S. Pat. No. 5,235,590, will be described below with reference to FIG. 6 and FIGS. 7(A)–(I).

Figure 4:
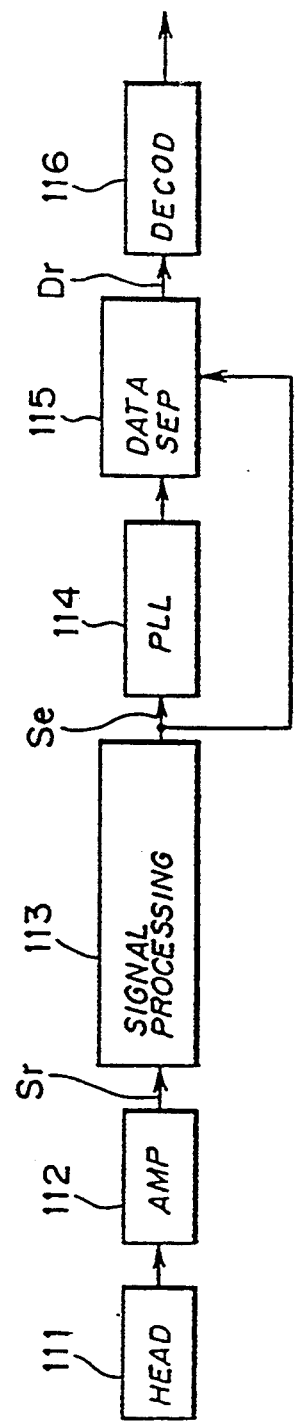
FIG. 4 is a system block diagram showing an example of a read out system in the conventional art.
Figure 5:
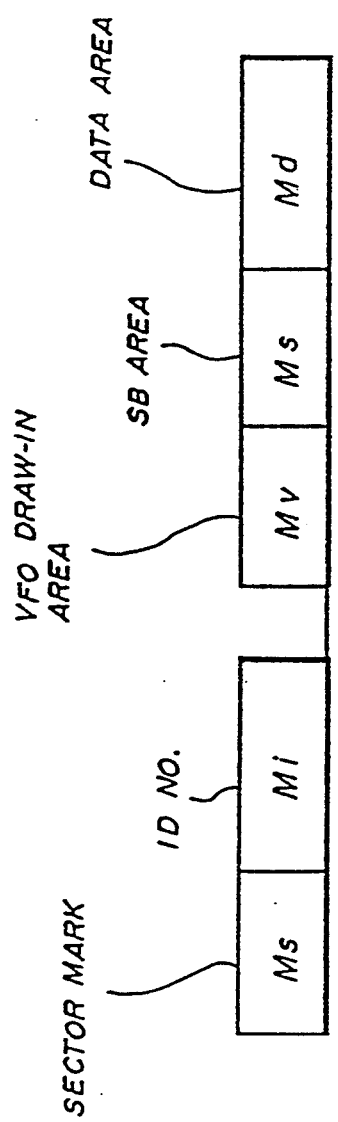
FIG. 5 is a diagram showing a data format for an magneto-optic disk.
Figure 6:
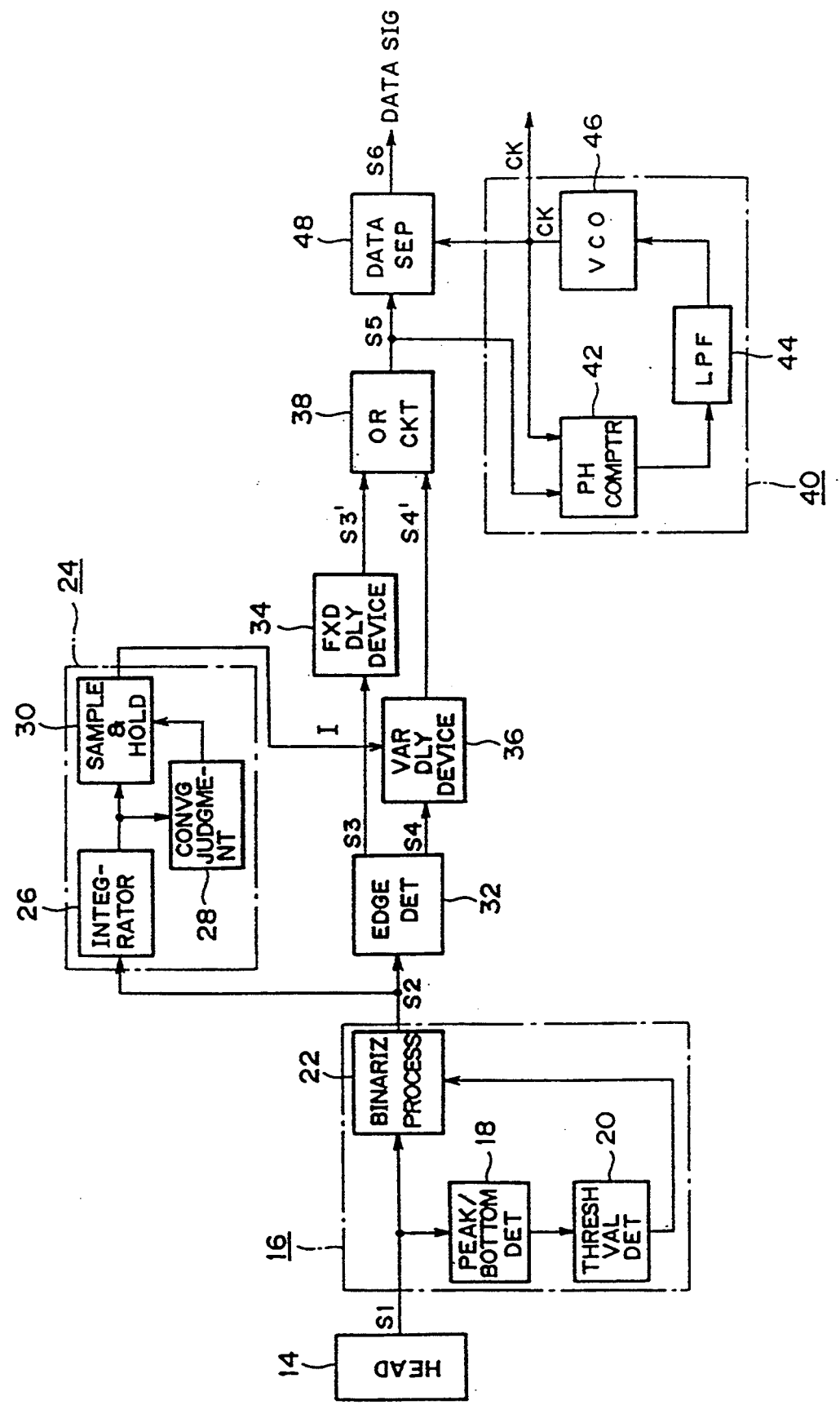
FIG. 6 is a block diagram of a data read out circuit substantially disclosed in a pending U.S. Application.
Figure 7:
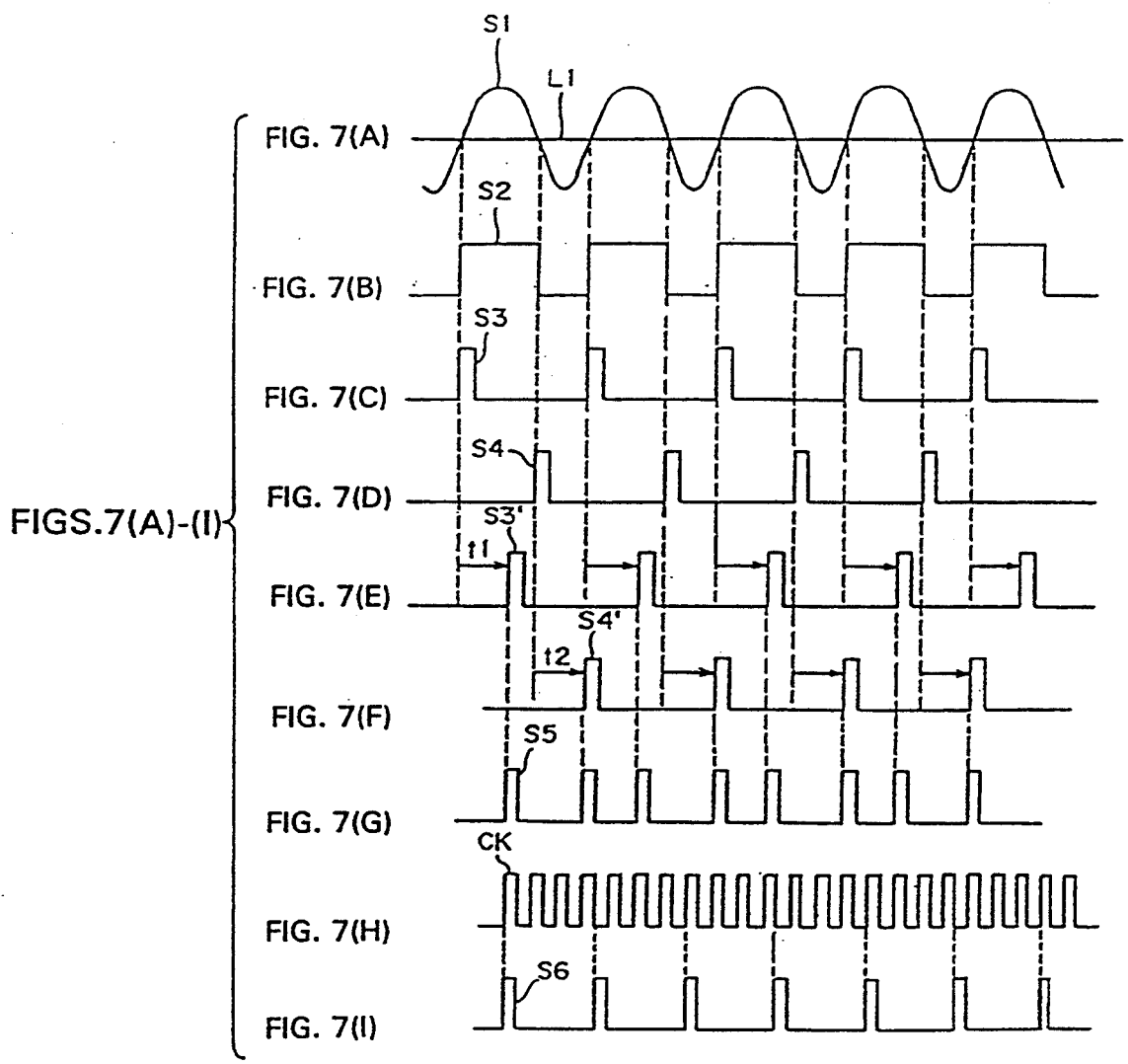
FIGS. 7(A)–(I) is a diagram showing waveforms of signals obtained in the circuit shown in FIG. 6.

Referring to FIG. 6, by throwing a laser beam on a track of a magneto-optic disk with an optical head 14, a read out signal S1 is generated. The read out signal S1 is converted into a binarized signal S2 with a rectangular waveform in a binarization means 16. The binarization means 16 includes a peak and bottom detection portion 18, a threshold value detection portion 20, and a binarization processor portion 22. In the peak and bottom detection portion 18, the peak and bottom of the amplitude level of the read out signal S1 is obtained and the middle point of the detected peak and bottom is obtained in the threshold value detection portion 20, and thereby the threshold value L1 as shown in FIG. 7(A) is detected.

Then, in the binarization processor portion 22, intersections of the read out signal S1 and the threshold value L1 are detected. Then, by detecting portions of the read out signal S1 with levels higher than the threshold value L1 and portions with levels lower than that, the intersections are determined to be rising edges and falling edges. Thereby, the binarization processor portion 22 generates a binarized signal S2 having a rectangular waveform with the portions at the higher level than the threshold value L1 set as the high level portions and the portions at the lower level than the threshold value L1 set as the low level portions, and outputs the signal therefrom.

An integrator means 24 includes an integrator circuit 26, a convergence judgment portion 28, and a sample and hold portion 30, and the binarized signal S2 is integrated therein and the integrated value I is held therein and output therefrom. While the integrator circuit 26 integrates the binarized signal S2 and outputs the integrated value therefrom, it has its own time constant and, hence, the integrated value does not converge to a target value unless a certain period of time elapses. Therefore, the convergence judgment portion 28 judges whether or not it has converged to a target integrated value. The sample and hold portion 30 samples and holds the integrated value I at the time when the convergence judgment portion 28 judges it to have converged and outputs the held value.

While the binarized signal S2 integrated here is that obtained by digitizing the read out signal S1 in an analog form, the portion at the head of the read out signal S1 is a signal from a VFO pull-in area of the magneto-optic disk. In the VFO pull-in area, there are generally formed magnetic domains with a predetermined length based on a recorded signal of the 2/7 run length limited code at predetermined intervals. Here, it is adapted such that, when these magnetic domains are read out, a read out signal S1 with a duty ratio of 50% will be obtained and hence the binarized signal S2 also comes to have its duty ratio at 50%. When the binarized signal S2 with the duty ratio 50% is integrated, the integrated value I becomes zero.

On the other hand, when the magnetic domains are longer than the predetermined length, the duty ratio of the read out signal S1 becomes larger than 50% and the integrated value of the same assumes a positive value. Conversely, when the magnetic domains are shorter than the predetermined length, the duty ratio of the read out signal S1 becomes smaller than 50% and the integrated value of the same assumes a negative value.

An edge detection portion 32 detects the rising edge of the binarized signal S2, and thereby outputs a front edge signal S3 in a pulse form as shown in FIG. 7(C) corresponding to the front edge of the magnetic domains. It also detects the falling edge of the binarized signal S2, and thereby outputs a rear edge signal S4 in a pulse form as shown in FIG. 7(D) corresponding to the rear edge of the magnetic domains. The edge detection portion 32 is connected with a fixed delay device 34 for delaying the front edge signal S3 by a predetermined time t1 and a variable delay device 36 for delaying the rear edge signal S4 by a time t2 corresponding to the integrated value I. FIG. 7(E) shows a front edge delayed signal S3' obtained by delaying the front edge signal S3 by the predetermined time t1, while FIG. 7(F) shows a rear edge delayed signal S4' obtained by delaying the rear edge signal S4 by the time t2 corresponding to the integrated value I.

The fixed delay device 34 is provided for delaying the front edge signal S3 by the predetermined time t1 so that the rear edge signal S4 may be relatively advanced. When the integrated value I is zero, it means that the magnetic domains are formed so as to have a reference length, and therefore, the time difference between the front edge signal S3 and the rear edge signal S4 at this time is a reference time difference. Hence, the rear edge signal S4 is delayed by the variable delay device 36 the same time as the time t1 by which the front edge signal S3 is delayed.

When the integrated value I is a positive value, it means that the magnetic domains are formed longer than the reference length, and therefore, the time difference between the front edge signal S3 and the rear edge signal S4, at this time, becomes larger than the reference time difference. Hence, the rear edge signal S4 is delayed a time shorter than the delay time t1 by which the front edge signal S3 is delayed so that the time difference between the front edge delayed signal S3' and the rear edge delayed signal S4' may become the reference time difference. On the other hand, when the integrated value I is a negative value, it means that the magnetic domains are formed shorter than the reference length, and therefore, the time difference between the front edge signal S3 and the rear edge signal S4, at this time, becomes smaller than the reference time difference. Hence, the rear edge signal S4 is delayed a time longer than the delay time t1 by which the front edge signal S3 is delayed so that the time difference between the front edge delayed signal S3' and the rear edge delayed signal S4' may become the reference time difference.

The front edge delayed signal S3' and the rear edge delayed signal S4' are input to an OR circuit 38 and an edge signal S5 shown in FIG. 7(G) is output from the OR circuit 30. A phase-locked loop (PLL) circuit 40 is formed of a phase comparator 42, a low-pass filter (LPF) 44, and a voltage-controlled oscillator (VCO) 46. The phase difference between the edge signal S5 and a clock signal CK output from the voltage-controlled oscillator 46 is obtained by the phase comparator 42 and the phase difference signal is supplied to the input terminal of the voltage-controlled oscillator 46 through the low-pass filter 44, so that the clock signal CK output from the voltage-controlled oscillator 46 shown in FIG. 7(H) is synchronized with the edge signal S5. This synchronized clock signal CK functions as the clock signal for reading out the user data recorded in the data area Md of the magneto-optic disk and it is also supplied to a data separator 48 and used therein to separate the data signal S6 shown in FIG. 7(I) from the edge signal S5.

In the above described data read out circuit of magneto-optic disk, a phase correction is being achieved by causing the variable delay device 36 to delay the rear edge signal S4 an amount corresponding to the integrated value I once held by the integrator means 24 such that the phase difference between the front edge delayed signal S3' and the rear edge delayed signal S4' becomes equal to the phase difference to be produced in the case where the magnetic domains are formed so as to have the reference length. More specifically, the data read out circuit shown in FIG. 6 is performing the control of the delay amount of the variable delay device 36 through open loop control. In this method, however, it is necessary to severely adjust in advance the delay time corresponding to each presumed value of the integrated value I. In this adjustment, it becomes necessary to take fluctuations among the delay devices and the like into consideration and, therefore, there is a problem that it takes much time for strictly adjusting the delay time for each variable delay device.

Further, there is no function provided in the above described data read out circuit to check whether or not the phase difference between the front edge delayed signal S3' and the rear edge delayed signal S4' has become a proper value after the rear edge signal S4 has been delayed. Therefore, there has been a problem that the data signal S6 becomes improper when an error is made in the phase correction.

A circuit for reading out data from an magneto-optic disk according to an embodiment of the present invention in which above described problems have been overcome will be described below with reference to FIG. 8 and FIGS. 9(A)-(J). In the description of the present embodiment, the component parts therein substantially like those in the data read out circuit shown in FIG. 6 will be denoted by corresponding reference numerals and some of the description of them will be omitted to avoid duplication. The point characteristic of the data read out circuit of the present embodiment is that a front edge delayed signal S3' and a rear edge delayed signal S7 are combined in a combiner portion 50 and the combined signal S8 is integrated in an integrator means 24, and a variable delay device 36 is feedback controlled so that the integrated value I' becomes approximately zero.

Figure 9:
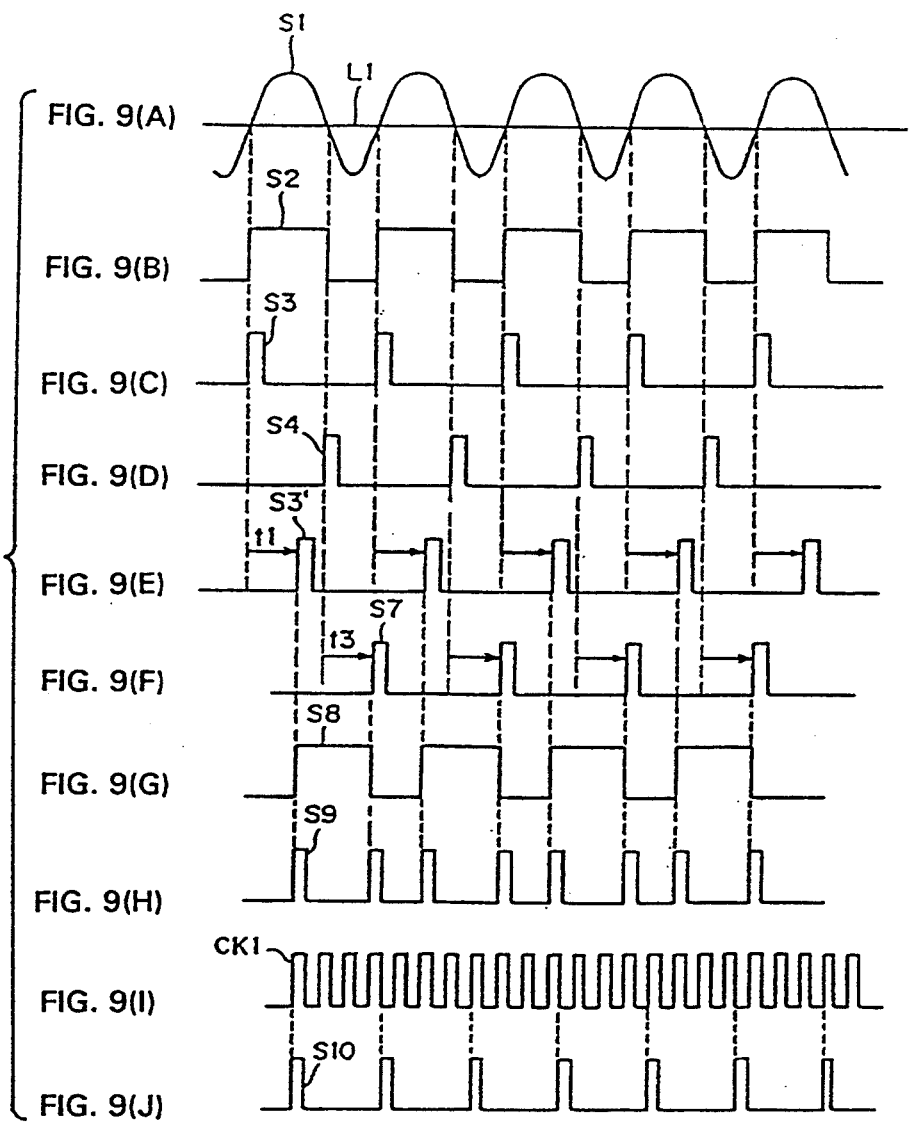
FIGS. 9(A)–(J) is a diagram showing waveforms of signals obtained in the circuit shown in FIG. 8.

The operation of the data read out circuit of the present embodiment will be described below. A signal S1 read out by an optical head 14 is converted by a binarization means 16 into a binarized signal S2 as shown in FIG. 9(B). The binarized signal S2 is input to an edge detection portion 32 and a front edge signal S3 and a rear edge signal S4 as shown in FIG. 9(C) and FIG. 9(D) are detected in the edge detection portion 32.

The front edge signal S3 is delayed a predetermined time t1 by a fixed delay device 34 and thereby the front edge delayed signal S3' as shown in FIG. 9(E) is output from the fixed delay device 34. The rear edge signal S4 is delayed by the variable delay device 36 a time t3 corresponding to the integrated value I' and thereby the rear edge delayed signal S7 as shown in FIG. 9(F) is output from the variable delay device 36.

The front edge delayed signal S3' and the rear edge delayed signal S7 are combined in the combiner portion 50 and thereby the combined signal S8 as shown in FIG. 9(G) is output from the combiner portion 50. As will be understood by reference to FIG. 9(G), the combined signal S8 is such a signal in which the intervals between the rising edges of the front edge delayed signal S3' and the rear edge delayed signal S7 are converted to alternating high levels and low levels and is analogous to the binarized signal S2 shown in FIG. 9(B).

The combined signal S8 is integrated by the integrator means 24 and the delay amount of the variable delay device 36 is controlled so that the integrated value I' becomes approximately zero. Controlling the integrated value I' to become approximately zero means that the control is made such that the duty ratio of the combined signal S8 becomes 50%. This is because the magnetic domain pattern in the VFO pull-in area of the magneto-optic disk generating the read out signal S1 is generally formed so as to have a predetermined length and arranged at a predetermined distance according to a recorded signal of the 2/7 run length limited code and, hence, when the magnetic domains are formed properly, the read out signal S1 should have the duty ratio at 50%, and the binarized signal S2 should also have the duty ratio at 50%.

Accordingly, when it is judged by the convergence judgment portion 28 that the integrated value I' has virtually converged to zero, the integrated value I' is held and output from the sample and hold portion 30, and thereby the delay amount in the variable delay device 36 is determined. The front edge delayed signal S3' and the rear edge delayed signal S7 are input to the OR circuit 38 and the edge signal S9 is output from the OR circuit 38.

The edge signal S9 is input to a PLL circuit 40 and a clock signal CK1 as shown in FIG. 9(I) output from its voltage-controlled oscillator 46 is synchronized with the edge signal S9. The synchronized clock signal CK1 functions as the clock signal for reading out the user data recorded in the data area of the magneto-optic disk and on the other hand, it is supplied to a data separator 48 so that the data separator 48 separates a data signal S10 from the edge signal S9 and outputs it.

In the above described embodiment, the delay amount of the variable delay device 36 is controlled by feedback control and phase correction is performed so that the phase difference between the front edge delayed signal S3' and the rear edge delayed signal S7 becomes equal to the phase difference which will be obtained if the magnetic domains are formed to have the reference length. Therefore, it becomes unnecessary as was the case with the data read out circuit shown in FIG. 6 to severely adjust in advance the delay time corresponding to each of presumed values of the integrated value and to strictly adjust the delay time for each variable delay device.

Further, since it is arranged such that the front edge delayed signal S3' and the rear edge delayed signal S7 obtained by delaying the front edge signal S3 and the rear edge signal S4 are combined and the delay amount of the variable delay device 36 is feedback controlled with the integrated value of the combined signal S8, a proper phase correction can be performed quickly.

Figure 10:
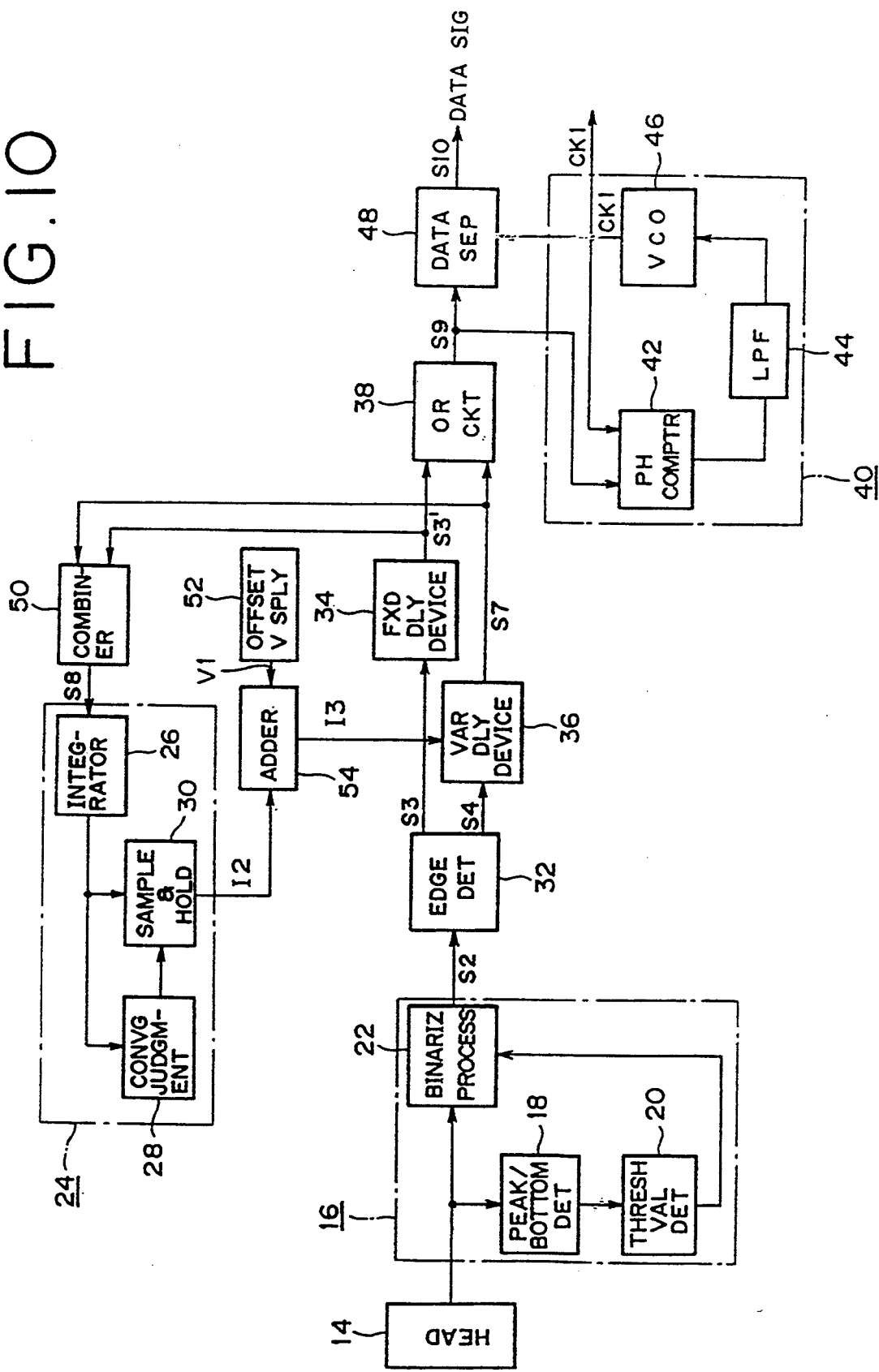
FIG. 10 is a block diagram of a data read out circuit according to another embodiment of the present invention.

Referring now to FIG. 10, a data read out circuit according to another embodiment of the present invention will be described. In the description of the present embodiment, the component parts therein substantially the same as those in the data read out circuits shown in FIG. 6 and FIG. 8 will be denoted by corresponding reference numerals and description of the same will be omitted to avoid duplication.

Figure 8:
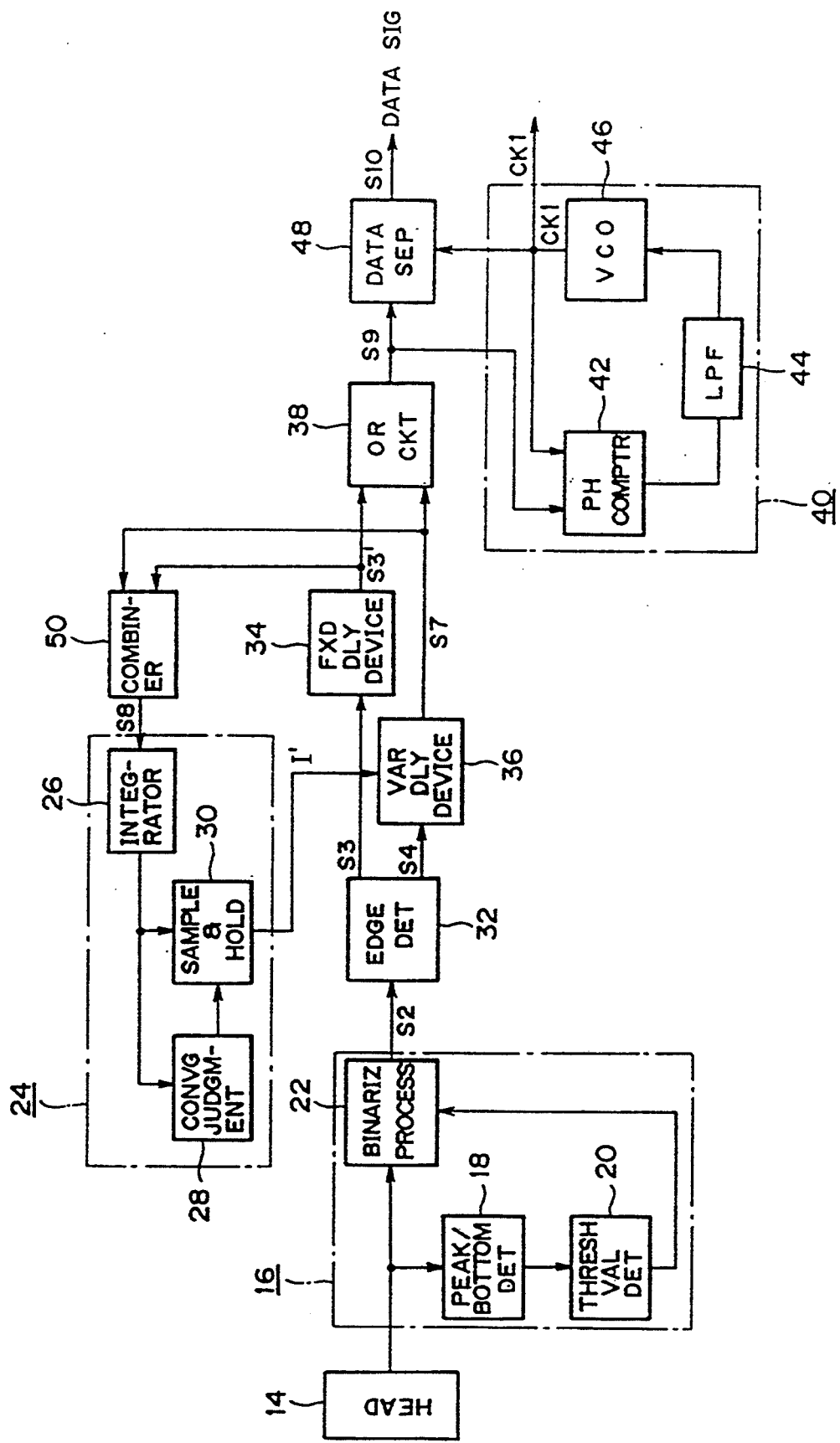
FIG. 8 is a block diagram of a data read out circuit according to an embodiment of the present invention.

The point in which the present embodiment is different from the embodiment shown in FIG. 8 is that an offset voltage causing virtually the same delay amount as the delay amount of the fixed delay device 34 to be generated in the variable delay device 36 is applied to the variable delay device 36 to thereby achieve the phase correction with higher accuracy. More particularly, an offset voltage supply 52 outputting such an offset voltage V1 is provided, the offset voltage V1 and an integrated value I2 output from the integrator means 24 are added up in an adder portion 54, and the thus obtained offset integrated value I3 is supplied to the variable delay device 36, so that the delay amount of the variable delay device 36 is feedback controlled.

In the embodiment shown in FIG. 8, while control is executed through the feedback loop such that the integrated value I' becomes zero, it hardly becomes zero in reality because the gain of the loop is finite and there is produced a residual. However, by the application of the offset voltage V1 as practiced in the present embodiment, the residual can be absorbed, and hence, it becomes possible to achieve the phase correction more accurately than in the embodiment shown in FIG. 8.

What is claimed is:

1. An apparatus for reading out data recorded on a magneto-optic disk by detecting edges of magnetic domains formed such that the direction of magnetization thereof is opposite to the direction of the magnetization initially formed on the magneto-optic disk, the edges of said magnetic domains corresponding to "1"s of the recorded data, comprising:

read out signal generation means for generating a read out signal by scanning the magnetic domains on said magneto-optic disk;
   binarization means connected with said read out signal generation means for converting the read out signal into a binarized signal;
   edge detection means connected with said binarization means for detecting from said binarized signal a front edge signal and a rear edge signal corresponding to the front edge and the rear edge of the magnetic domains, respectively;
   fixed delay means connected with said edge detection means for delaying either of said front edge signal and said rear edge signal;
   variable delay means connected with said edge detection means for delaying the other of said front edge signal and said rear edge signal;
   combiner means connected with said fixed delay means and said variable delay means for combining the output signal of said fixed delay means and the output signal of said variable delay means;
   integrator means connected with said variable delay means and said combiner means for integrating the output signal of said combiner means and outputting the integrated value to said variable delay means, said integrated value determining the delay amount of said variable delay means;
   an OR circuit connected with said fixed delay means and said variable delay means for outputting an edge signal;
   a phase-locked loop circuit connected with said OR circuit for generating a clock signal synchronized with said edge signal; and
   data separator means connected with said phase-locked loop circuit and said OR circuit for separating the data from the edge signal output from said OR circuit by the use of the clock signal output from said phase-locked loop circuit.

2. An apparatus for reading out data according to claim 1, wherein said binarization means comprises:
   peak and bottom detection means for detecting peak and bottom of an amplitude level of the read out signal;
   threshold value detection means connected with said peak and bottom detection means for detecting a middle point of the peak and the bottom of the read out signal and outputting the middle point as a threshold value; and
   binarization processor means connected with said threshold value detection means for detecting intersections of the read out signal and the threshold value to thereby generate a binarized signal with a rectangular waveform having a level of the read out signal higher than the threshold value as its high level and having a level of the read out signal lower than the threshold value as its low level.

3. An apparatus for reading out data according to claim 1, wherein said combiner means generates a combined signal with a rectangular waveform which rises at the rising edge of the output signal of said fixed delay means and falls at the rising edge of the output signal of said variable delay means.

4. An apparatus for reading out data according to claim 1, wherein said integrator means comprises:
   an integrator circuit for integrating the combined signal and outputting the integrated value;
   convergence judgment means for judging whether or not the integrated value has converged to a specific value; and
   sample and hold means for sampling, holding, and outputting the integrated value obtained at the time when said convergence judgment means judges that the integrated value has converged.

5. An apparatus for reading out data according to claim 4, wherein said sample and hold means holds and outputs the integrated value when the integrated value has virtually become zero.

6. An apparatus for reading out data according to claim 1, wherein said phase-locked loop circuit comprises:
   a voltage-controlled oscillator generating a clock signal; and
   a phase comparator for comparing phases of the edge signal output from said OR circuit and the clock signal output from said voltage-controlled oscillator to thereby generate a phase difference signal and inputting the phase difference signal to said voltage-controlled oscillator.

7. An apparatus for reading out data according to claim 1, further comprising:
   voltage supply means for supplying an offset voltage to said variable delay means to thereby cause said variable delay means to generate a delay amount virtually equal to the delay amount of said fixed delay means; and
   adder means for adding the offset voltage and the integrated value output from said sample and hold means.

* * * * *